April 9, 1929.   A. MOORE   1,708,427

ANTIDETONATION COMBUSTION CHAMBER FOR INTERNAL COMBUSTION ENGINES

Filed Oct. 18, 1926   3 Sheets-Sheet 1

INVENTOR
Arlington Moore
BY H. H. Dyke
ATTORNEY

April 9, 1929.  A. MOORE  1,708,427
ANTIDETONATION COMBUSTION CHAMBER FOR INTERNAL COMBUSTION ENGINES
Filed Oct. 18, 1926   3 Sheets-Sheet 3
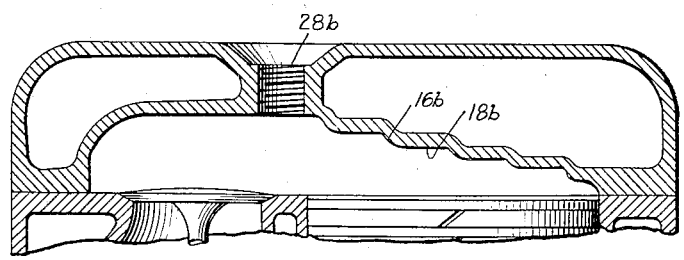
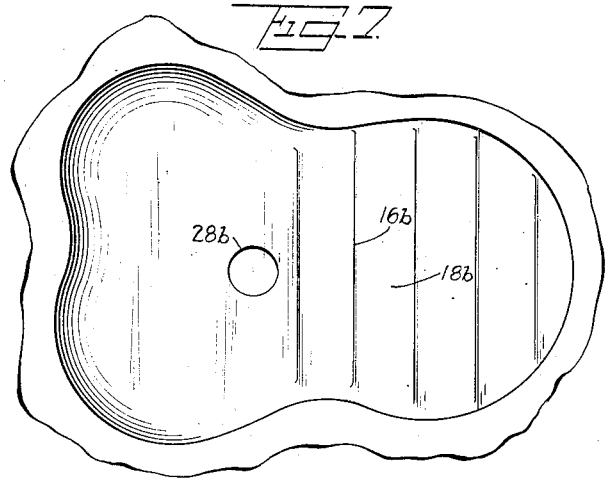
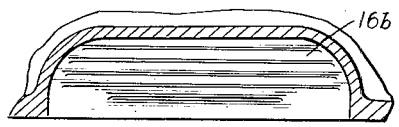
INVENTOR
Arlington Moore
BY H. H. Dyke
ATTORNEY

Patented Apr. 9, 1929.  1,708,427

UNITED STATES PATENT OFFICE.

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE.

ANTIDETONATION COMBUSTION CHAMBER FOR INTERNAL-COMBUSTION ENGINES.

Application filed October 18, 1926. Serial No. 142,231.

My invention relates to an anti-detonation combustion chamber for internal combustion engines.

The cylinder head of an internal combustion engine in accordance with my invention has the upper wall or ceiling of the combustion chamber therein at different heights in different parts thereof. Preferably the ceiling of the combustion chamber or a part thereof is formed in plural planes at varying heights above the piston. The language of the vertical engine is employed herein for convenience of expression, though the invention is not so limited and the cylinders may be horizontal or slanting or arranged in other ways.

In the case of a side valve engine, and particularly an L-head engine, the plural planed surface of the combustion chamber is preferably confined or substantially confined to that part of the combustion chamber which is located over the cylinder bore, and in a preferred embodiment of the invention as applied to an L-head engine, the ceiling of the combustion chamber is of substantially terraced formation arranged in planes decreasing in height from near the valve side of the engine toward the further side of the cylinder bore. The terrace surfaces may be formed and arranged in various ways, as straight across, curved, herring-bone, and the like, and there may be a plurality of sets of terraces, the terraces may be arched or highest in the middle and of various other forms.

Figure 1:
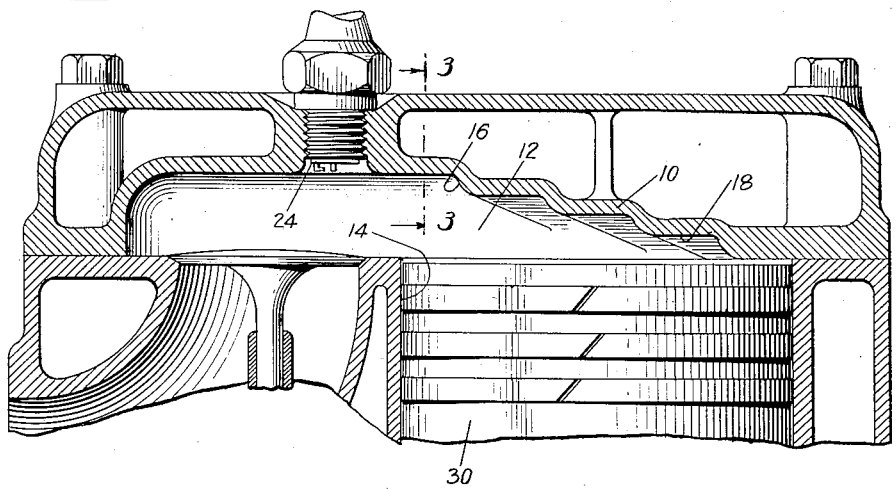
Figure 2:
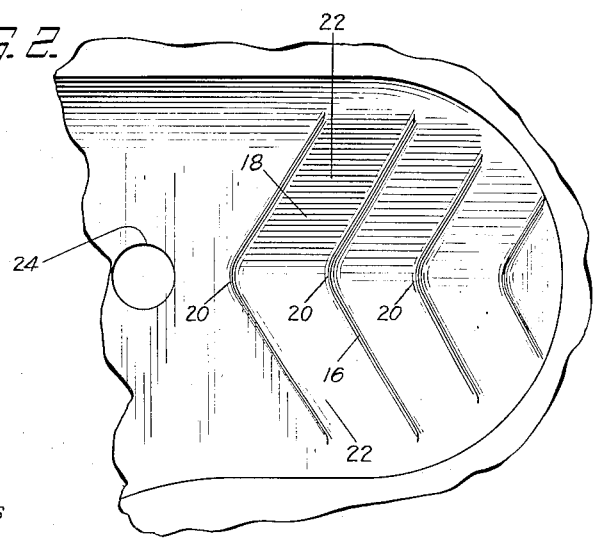
Figure 3:
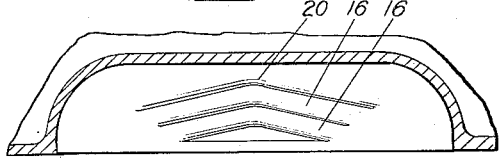
Figure 4:
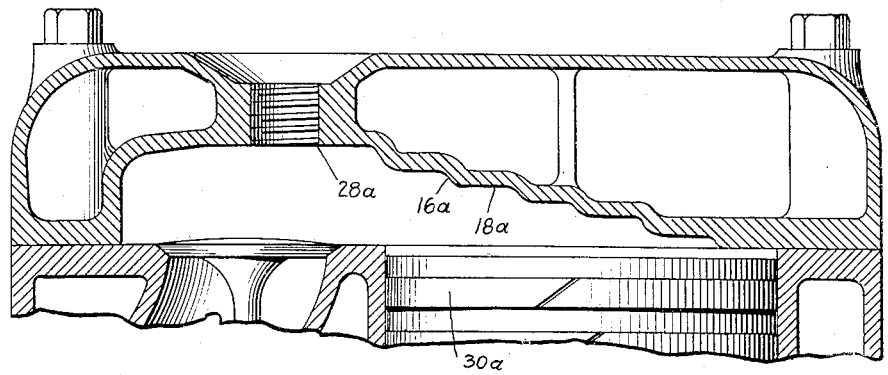
Figure 5:
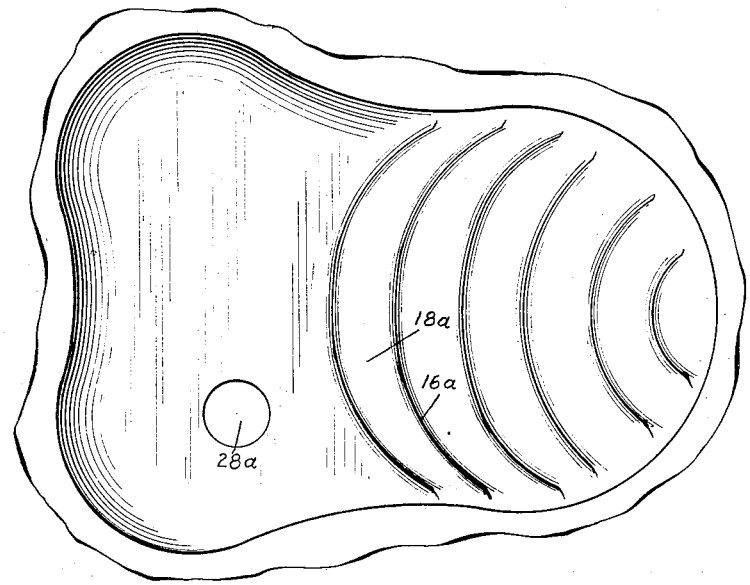

My invention will be best understood from a description of the illustrative embodiments shown in the accompanying drawings, in which Fig. 1 is a section of an L-head engine having a terraced combustion chamber ceiling of substantially herring-bone formation. Fig. 2 is a bottom plan view of the combustion chamber of Fig. 1. Fig. 3 is a section on line 3—3, Fig. 1. Fig. 4 is a section similar to Fig. 1 of an engine with a modified form of terraced formation of the combustion chamber ceiling. Fig. 5 is a bottom plan view of the combustion chamber of Fig. 4 having the terraces rounded out on the spark plug side. Fig. 6 is a section of a third form of engine. Fig. 7 is a bottom plan view of the combustion chamber of Fig. 6, and Fig. 8 is a cross-section of Fig. 6.

In the form shown in Figs. 1, 2 and 3, the portion 10 of the wall of combustion chamber 12, which is located above the cylinder bore 14, is formed with alternate approximately vertical riser surfaces 16 and approximately plane surfaces 18, which are adapted to reduce the height of the combustion chamber in a substantial step by step fashion from the valve side of the combustion chamber toward the opposite side thereof, and the flats 18 and risers 16 are of substantially V or herring-bone formation presenting the relatively pointed or angular advance portions 20 directed toward the valve side of the combustion chamber and falling back at each side of these advance portions, as indicated at 22, 22. The spark plug 24 is preferably located substantially opposite the prow-like or advanced portions 20. The substantially plane surfaces 18, 18 preferably rise to a highest elevation and substantially intersect along substantially the major axial lines of the combustion chamber and slant downwardly on each side of such axial line, substantially as shown in the sectional view, Fig. 3.

In the form of Figs. 4 and 5 the flats and risers 18$^a$ and 16$^a$, instead of being of herring-bone formation, are of substantially arcuate formation, and with such formation the spark plug location 28$^a$ can advantageously be moved to a position closer to one of the valves, preferably the intake valve, as shown in Fig. 5. The pistons 30 and 30$^a$, as shown for use in connection with the stepped combustion chamber walls of Figs. 1 and 4, are of the customary flat head construction.

In the form of Figs. 6, 7 and 8 the flats and risers 18$^b$ and 16$^b$ run substantially straight across the combustion chamber wall at right angles to the major axis thereof and, with this arrangement, the spark plug location 28$^b$ is substantially opposite the middle of the stepped surfaces so provided.

Without commitment to a particular theory, it is my belief that the terraced formation of the combustion chamber wall over the cylinder bore serves to produce a turbulent and agitated condition of the gases on the intake stroke, which promotes the thorough distribution of the fuel throughout the charge mixture, that upon the rising and compression of the gases against the terraced roof of the combustion chamber this thorough mixing is carried further and there is substantially a driving or forcing of the charge gases across the combustion chamber toward the valve side in a more or less wavy and lamellar manner because of the plural-plane formation of the terraced ceiling of the combustion chamber, resulting in more or less difference in the lateral movement of the gas in regions of the various strata or layers in which they are driven across the combustion chamber; and upon ignition this situation is substantially reversed, the flame wave and any pressure wave occurring in connection with the flame travel being broken up and subdivided as the several riser surfaces and related plane surfaces are encountered and traversed; that there is an advantageous surface combustion effect due to gas concentration on or adjacent to the extensive wall surface provided, and such extensive wall surface permits reduction of combustion chamber clearance volume without reduction in surface area, and even with actual increase thereof, and the resulting effective delivery of heat to the water jacket will avoid excessive rise of temperature, which would produce detonation and, by acting to withdraw heat which is carried away from regions of incipient incandescence by the highly turbulent movement of the charge gases, will prevent preignition. The rounded terraces and those of herring-bone formation, in addition to the foregoing, are adapted to produce additional cross or eddy currents and subdivisions, which serve to increase turbulence and to secure more effective breaking up of any pressure wave during the burning of the charge.

The highest benefits of the present invention are realized when complete combustion and absence of carbon deposits are obtained by the use of my improved system of combustion, involving the supplying to the engine intake above the throttle of exhaust gas and air at temperatures and in proportions and quantities metered to suit the engine requirements at varying speeds and loads, as set forth, for example, in my copending application Serial No. 757,075, filed Dec. 19, 1924.

I claim:

1. An internal combustion engine comprising a portion of step formation in the combustion chamber thereof, and ignition means in said combustion chamber disposed laterally of and facing said portion of step formation; a part of said combustion chamber contiguous to said portion of step formation increasing in cross-sectional area towards said ignition means.

2. An internal combustion engine comprising a portion of substantially terraced formation in the combustion chamber thereof; a part of said combustion chamber contiguous to said terraced portion increasing in height towards the point of ignition.

3. An internal combustion engine comprising a cylinder, a piston portion therein, and an opposing portion in spaced relation thereto; certain of said portions having a step formation and providing therebetween a combustion chamber increasing in height towards the point of ignition.

4. An internal combustion engine comprising a portion in the combustion chamber thereof including a plurality of horizontal surfaces disposed successively at different elevations and riser surfaces connecting the same, and ignition means disposed in said combustion chamber laterally of said portion of step formation and facing the riser surfaces thereof.

5. An internal combustion engine comprising a portion of step formation in the combustion chamber thereof serving to constrict the part of the combustion chamber contiguous thereto, and ignition means disposed in the larger part of said combustion chamber.

6. An internal combustion engine comprising a cylinder having a combustion chamber at the end thereof extending laterally therefrom, a piston portion in said cylinder, valves in the laterally extending portion of said combustion chamber, and igniting means therein; said piston portion in the top center position thereof and the opposing wall portion of the combustion chamber converging in a direction away from the laterally extending portion of said combustion chamber, and certain of said portions having a step formation.

7. An internal combustion engine comprising a cylinder having a combustion chamber at the end thereof extending laterally therefrom, a piston in said cylinder, intake and exhaust valves in the laterally extending portion of said combustion chamber, and ignition means therein; a part of the ceiling of said combustion chamber over said cylinder having a step formation varying in height above the piston in the top center position thereof substantially from the valve side of the piston to the opposite side thereof, and serving to constrict the space therebetween relatively to the space occupied by said valves and said igniting means.

8. A cylinder head for internal combustion engines, the ceiling of the combustion chamber whereof comprises a plurality of substantially plane surfaces, which are of successively lesser height above the cylinder bore space at increasing distances from the region of ignition.

9. A cylinder head for internal combustion engines, the ceiling of the combustion chamber whereof over the cylinder space is of substantially terraced formation and of height increasing toward the ignition side of the combustion chamber.

10. A cylinder head for internal combustion engines, the height of the ceiling whereof over the piston increases by substantially well defined steps from the side furthest away from the ignition region toward the side nearest said region.

11. In an internal combustion engine comprising a cylinder having a combustion chamber at the end thereof extending laterally therefrom, a piston in said cylinder, and intake and exhaust valves in the laterally extending portion of said combustion chamber; the part of the ceiling of said combustion chamber over said piston having a step formation decreasing in height above the piston substantially from the valve side of the piston to the opposite side thereof.

In testimony whereof, I have signed my name hereto.

ARLINGTON MOORE.